(12) United States Patent
Puri et al.

(10) Patent No.: US 7,884,742 B2
(45) Date of Patent: Feb. 8, 2011

(54) SYSTEM AND METHOD FOR EFFICIENT COMPRESSION OF DIGITAL DATA

(75) Inventors: Rohit Puri, San Jose, CA (US); Parthasarathy Sriram, Los Altos, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 11/422,974

(22) Filed: Jun. 8, 2006

(65) Prior Publication Data

US 2007/0285285 A1 Dec. 13, 2007

(51) Int. Cl.
*H03M 7/40* (2006.01)
(52) U.S. Cl. .............................. 341/67; 341/59; 341/65; 341/99
(58) Field of Classification Search .................. 341/65, 341/67, 59, 99; 375/204.02, 204.15, 204.16, 375/204.17; 382/239, 248, 250, 251
See application file for complete search history.

(56) References Cited

U.S. PATENT DOCUMENTS

| | | | |
|---|---|---|---|
| 5,714,950 A * | 2/1998 | Jeong et al. .................... 341/67 |
| 5,742,342 A * | 4/1998 | Jung ..................... 375/240.03 |
| 5,751,232 A * | 5/1998 | Inoue et al. ..................... 341/63 |
| 5,883,671 A | 3/1999 | Keng et al. |
| 5,883,823 A | 3/1999 | Ding |
| 6,009,203 A | 12/1999 | Liu et al. |
| 6,081,783 A | 6/2000 | Divine et al. |
| 6,151,359 A | 11/2000 | Acer et al. |
| 6,157,396 A | 12/2000 | Margulis et al. |
| 6,222,467 B1 | 4/2001 | Moon |
| 6,259,741 B1 | 7/2001 | Chen et al. |
| 6,426,975 B1 * | 7/2002 | Nishi et al. ............. 375/240.13 |
| 6,442,206 B1 | 8/2002 | Hrusecky |
| 6,459,738 B1 | 10/2002 | Wu et al. |
| 6,504,496 B1 | 1/2003 | Mesarovic et al. |
| 6,546,145 B1 * | 4/2003 | Miyake et al. ............... 382/248 |
| 6,587,057 B2 | 7/2003 | Scheuermann |
| 6,647,061 B1 | 11/2003 | Panusopone et al. |
| 6,799,192 B1 | 9/2004 | Handley |
| 6,992,605 B2 * | 1/2006 | Kadono et al. ................. 341/67 |
| 7,046,175 B1 | 5/2006 | Subramaniam |
| 7,095,344 B2 * | 8/2006 | Sekiguchi et al. ............ 341/107 |
| 7,095,896 B2 * | 8/2006 | Abe et al. .................... 382/233 |

(Continued)

FOREIGN PATENT DOCUMENTS

JP 11096138 4/1999

OTHER PUBLICATIONS

Lee, W., et al., "MPEG-2 Decoder Implementation on MAP-1000A Media Processor Using the C Language," Proc. SPIE: Media Processors 2000, International Soc. for Optical Engineering (Bellingham, Washington), pp. 27-36.

(Continued)

*Primary Examiner*—Linh V Nguyen

(57) ABSTRACT

A system for compressing digital data by representing a portion of it predictionally and transformationally as a block of transform coefficients, then quantizing that block selectively into a set of encoding symbols based on an indication whether the transform coefficients represent the portion as having a particular characteristic, and then by encoding the set of encoding symbols into a data bit stream. In particular, frequency may be used as the characteristic of the digital data in many applications.

33 Claims, 7 Drawing Sheets

U.S. PATENT DOCUMENTS

| | | | |
|---|---|---|---|
| 7,109,898 B2 * | 9/2006 | Kadono et al. | 341/67 |
| 7,113,115 B2 | 9/2006 | Partiwala et al. | |
| 7,129,862 B1 * | 10/2006 | Shirdhonkar et al. | 341/67 |
| 7,132,963 B2 | 11/2006 | Pearlstein et al. | |
| 7,161,508 B2 * | 1/2007 | Kadono et al. | 341/67 |
| 7,283,589 B2 | 10/2007 | Cai et al. | |
| 7,286,066 B1 | 10/2007 | Ho et al. | |
| 7,289,047 B2 * | 10/2007 | Nagori | 341/67 |
| 7,324,026 B2 | 1/2008 | Puri et al. | |
| 7,372,378 B2 | 5/2008 | Sriram | |
| 7,372,379 B1 | 5/2008 | Jia et al. | |
| 7,480,418 B2 | 1/2009 | Niemi et al. | |
| 7,605,725 B2 | 10/2009 | Puri et al. | |
| 2003/0014241 A1 | 1/2003 | Ferris et al. | |
| 2003/0078952 A1 | 4/2003 | Kim et al. | |
| 2003/0079222 A1 | 4/2003 | Boykin et al. | |
| 2004/0057522 A1 | 3/2004 | Wu et al. | |
| 2005/0015248 A1 * | 1/2005 | Kadono et al. | 704/230 |
| 2005/0033788 A1 | 2/2005 | Handley | |
| 2005/0117056 A1 | 6/2005 | Aprea et al. | |
| 2005/0229231 A1 | 10/2005 | Lippincott | |
| 2005/0254583 A1 * | 11/2005 | Kim et al. | 375/240.23 |
| 2006/0071829 A1 * | 4/2006 | Pearlstein et al. | 341/67 |
| 2006/0176960 A1 | 8/2006 | Lu et al. | |
| 2007/0061522 A1 | 3/2007 | Vink | |
| 2007/0065027 A1 * | 3/2007 | Boon et al. | 382/238 |
| 2009/0103824 A1 | 4/2009 | Niemi et al. | |

OTHER PUBLICATIONS

Nikara, J., et al., "Parallel Multiple-Symbol Variable-Length Decoding," Pro. of 2002 IEEE Intl Conf on Comp. Design: VLSI in Comp Processors, IEEE, pp. 1-6; (May 19, 2002).

Texas Instruments, TMS320C6411 Fixed Point Digital Signal Processor Datasheet May 19, 2006, http://focus.ti.com/docs/prod/folders/print/tms320c6411.html.

Arm, "ARM926EJ-S Jazelle Enhanced Macrocell", May 19, 2006, http://www.arm.com/products/CPUs/ARM926EJ-S.html.

The Moving Picture Experts (MPEG), "MPEG Standards", May 19, 2006, http://www.chiariglione.org/mpeg/standards.html.

Rohini Krishnan; et al., "Design of a 2D DCT/IDCT Application Specific VLIW Processor Supporting Scaled and Sub-sampled Blocks," 16th International Conference on VLSI Design, 2003, Six Pages.

Madisetti, Vijay K. The Digital Processing Handbook, CRC Press LLC., 1998, Chapters 37 & 40, pp. 37-2, 37-3, 37-4, 40-6, 40-10, 40-12, 40-13, 40-15, 40-16.

Abdellatif Benjelloun Touimi et al., "Efficient Conversion Method Between Subband Domain Representations", Jul. 2005, IEEE, p. 1-4, Speech and Sound Technologies and Processing Lab, France Telecom Research & Development.

* cited by examiner

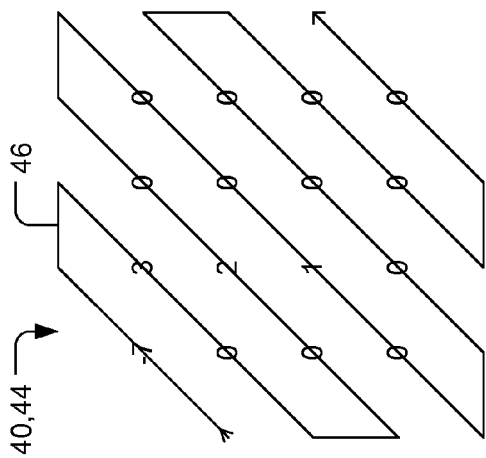
FIG. 2a (background art)
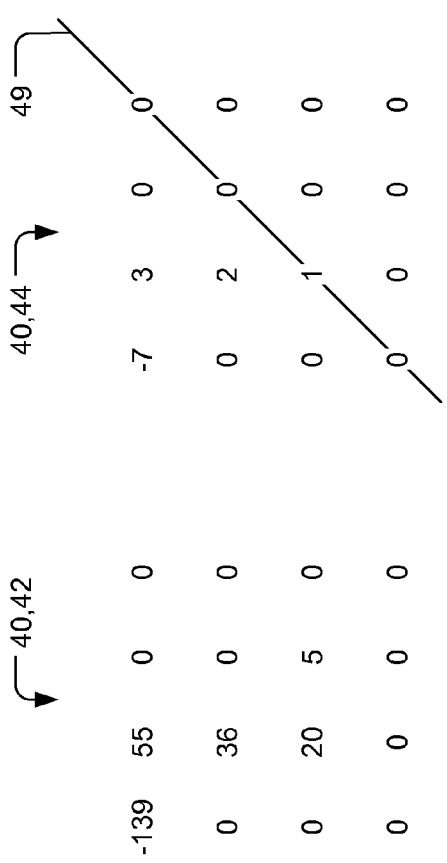
FIG. 2b (background art)
FIG. 2c (background art)
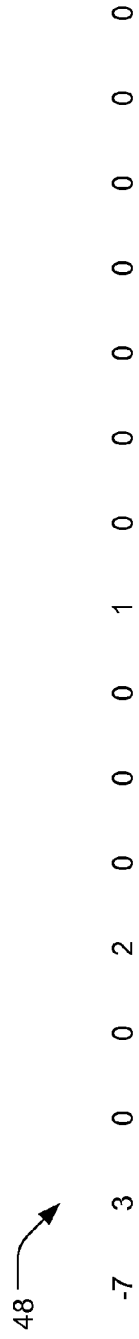
FIG. 2d (background art)
FIG. 2e (background art)

| total_zeros value | codeword |
|---|---|
| 0 | 1 |
| 1 | 011 |
| 2 | 010 |
| 3 | 0011 |
| 4 | 0010 |
| 5 | 0001 1 |
| 6 | 0001 0 |
| 7 | 0000 11 |
| 8 | 0000 10 |
| 9 | 0000 011 |
| 10 | 0000 010 |
| 11 | 0000 0011 |
| 12 | 0000 0010 |
| 13 | 0000 0001 1 |
| 14 | 0000 0001 0 |
| 15 | 0000 0000 1 |

| | B<br>112b | C<br>112c |
|---|---|---|
| A<br>112a | Current block<br>110 | |

```
1  0  1  0         1  1  0  1

0  1  0  0         0  0  0  0

0  0  0  0         0  0  1  0

1  0  1  1         0  1  0  1
```

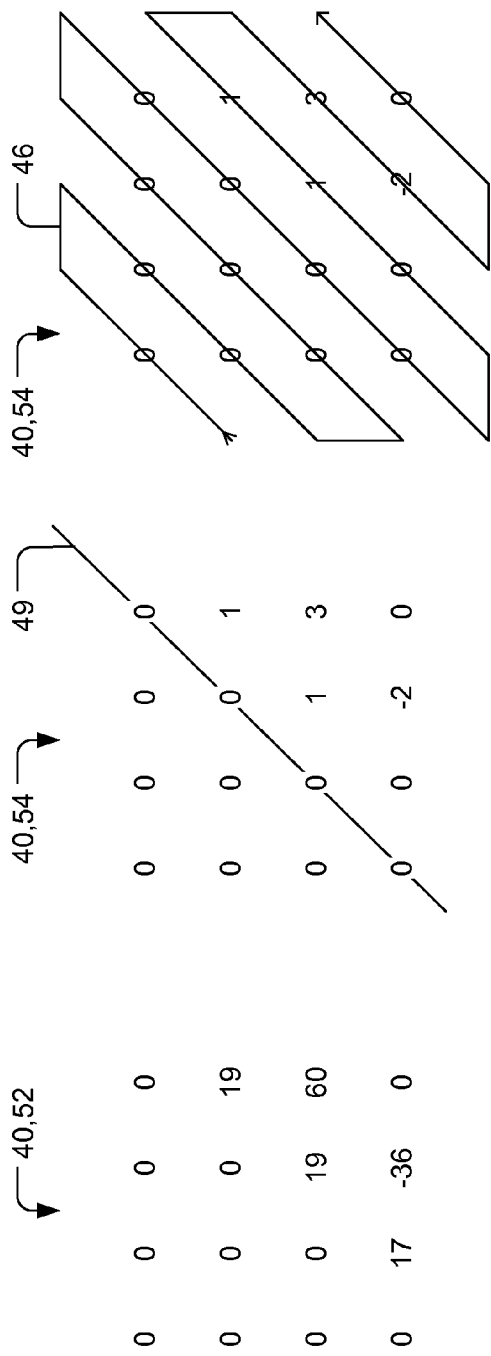

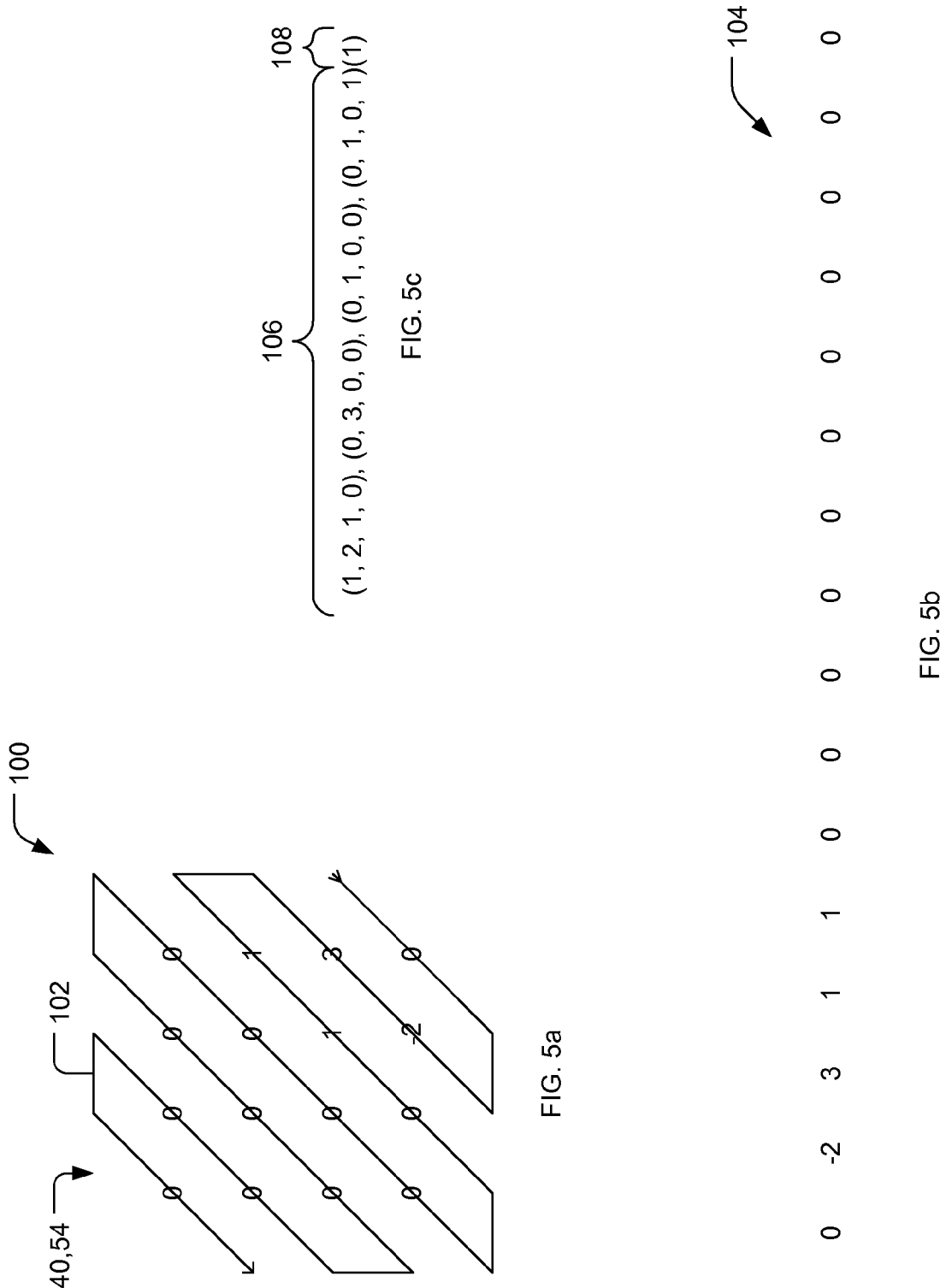

SYSTEM AND METHOD FOR EFFICIENT COMPRESSION OF DIGITAL DATA

TECHNICAL FIELD

The present invention relates generally to coded data generation or conversion, and more particularly to converting digital signals representing information into a different system of digital signals representing substantially the same information more compactly.

BACKGROUND ART

The following pertains generally to digital data compression as it may be employed in many applications. Since it would be odious and redundant to present examples of both loss-less and lossy type compression across the entire range of potential applications, the examples presented herein relate primarily to lossy type compression applied to video type data. Video type data is especially challenging and of particular concern to industry presently, and lossy type compression techniques are well suited for compressing it and typically permit more notable efficiency increases. The choice of these as examples, however, should not be construed as implying limitations in the technical principles being discussed or in the scope of the present invention.

FIG. 1 (background art) is a block diagram showing the major elements of a typical end-to-end video system 10. The video system 10 includes a video encoder 12 and a video decoder 14, and it will also often have an optional intermediate channel 16 (e.g., for data storage or transmission). The video encoder 12 accepts a video sequence of raw video data 18 that includes a time indexed collection of raw frames 20 (also called images) to produce a compressed data bit stream 22. And conversely, the video decoder 14 accepts the data bit stream 22 and converts it back into a video sequence (now processed video data 24) that includes a collection of processed frames 26. The intermediate channel 16, if present, can efficiently store the data bit stream 22 or transmit it to another location. The term "channel" is used here as it widely used in electrical engineering, to denote a system that displaces with respect to time, space, or both. While important in many applications, the intermediate channel 16 is not especially relevant here and is therefore not discussed further.

The raw video data 18 and the processed video data 24, and similarly the raw frames 20 and the processed frames 26, are rarely ever the same. Since the raw video data 18 is typically associated with high bandwidth, a lossy type of compression is desirably employed to better facilitate handling of the data bit stream 22 and ultimately also of the processed video data 24. While lossy compression, as its name implies, loses some of the original information content of the raw video data 18, this is often an acceptable compromise because of one or more of the benefits that it can provide over loss-less type compression. For example, lossy compression usually results in the data bit stream 22 being much more compact, and it frequently also permits performing compression and/or decompression operations faster and with less processing resources.

In FIG. 1 the video encoder 12 of the video system 10 has four major stages: a prediction stage 28, a transformation stage 30, a quantization stage 32, and an entropy coding stage 34. The first two of these stages exploit inherent redundancy in the raw video data 18 to compactly represent it in the data bit stream 22. This works well in many applications because the raw video data 18 is frequently characterized by a high degree of correlation between the successive raw frames 20 that it contains, as well as between the neighboring data in each particular raw frame 20.

If each of the raw frames 20 in a sequence are viewed as being partitioned into grids of rectangular blocks of data (e.g., of size ranging from 4×4 to 16×16 pixels), a very simple block-motion model can then be applied wherein the blocks in a current frame can be viewed as arising from data in the previous raw frame that has been shifted in location. This usually offers a compact and reasonably accurate description (also called a predictor) of a video process.

The prediction stage 28 of the video encoder 12 therefore employs a shift component and a difference component. The shift component (also called the motion vector) represents a change in the location of a block from where it was located in the prior frame (if any) and the difference component represents a change in the information in the block now versus the information in the block as it existed in the previous frame (i.e., at its previous location there).

The transformation stage 30 takes the output of the prediction stage 28 and transforms it into the frequency domain to achieve more compaction. When the block-motion model provides a good description of a given set of raw video data 18, the corresponding residue information has small energy and corresponds to a low-frequency characteristic in the domain produced by the transform stage. As will be seen presently, this particularly effects how the following stages contribute to the efficiency of the video system 10.

The quantization stage 32 takes the output of the transformation stage 30 and applies a lossy compression to it, wherein individual transform coefficients are scaled down and truncated to the nearest integer. This lossy compression is usually a major contributor to the overall efficiency of the video system 10.

The entropy coding stage 34 takes the output of the quantization stage 32 and applies a loss-less compression to it, wherein quantization symbols are mapped into bits. Usually this entropy coding is implemented with a variable-length scheme such as Huffman coding.

The video decoder 14, in straightforward manner, employs the stages discussed above in reverse, reversing the actions performed by the video encoder 12 so that the compressed data bit stream 22 is converted back into a usable video sequence (i.e., the processed video data 24).

At their core, essentially all commercial grade video compression systems today employ these stages and techniques. For example, H.261, H.263, and H.264 (collectively H.26x) and MPEG-1, MPEG-2 to MPEG-4 (collectively MPEG-x) are current well-known standards that employ these and that are widely employed in video compression today. H.264 type video compression is used in the examples herein, although the following is applicable to compressing any bandwidth limited data (e.g., JPEG and other still image standards, or MP3 and other audio standards, to list just two well known examples of two common subject matter types).

The actual compression in a video system 10 takes place in the lossy compression quantization stage 32 and in the loss-less compression entropy coding stage 34, and these are now considered in more detail.

FIG. 2a-e are a series of depictions of a data block 40 undergoing processing by the quantization stage 32. H.264 standard type video compression is used in the example here, where processing is performed on 4×4 blocks.

FIG. 2a shows a hypothetical input to the quantization stage 32 of a 4×4 data block (raw block 42) that includes data called transform coefficients (since this "input" is output from the transformation stage 30).

FIG. 2b shows a low-frequency block 44 (termed such here for reasons discussed presently) that is an intermediate result in the processing of the raw block 42 of FIG. 2a. The individual coefficients now have been scaled down and truncated to the nearest integer. For example, say the value of a transform coefficient is 55 and the quantization scale being applied is 18. This transform coefficient is then quantized to a quantization level of 55/18=3. Alternately, a transform coefficient of 5 is quantized to 0.

Digressing briefly, it can be appreciated that this is a lossy operation, since in the video decoder 14 a quantization level of 3 will multiplied by the same quantization scale (18) giving a reconstruction value of 3*18=54 (not 55), and a quantization level of 0 will give a reconstruction value of 0*18=0 (not 5).

FIG. 2c illustrates the conventional linear zigzag forward scan order 46 used next in the quantization stage 32, and FIG. 2d shows the one-dimensional low-frequency array 48 (also termed such here for reasons discussed presently) that this produces.

It can be appreciated from FIGS. 2b-d that a large percentage of the transform coefficients in a data block 40 become quantization levels equal to zero for typical H.264 type video data. Furthermore, when the conventional forward scan order 46 is used, there is a very high likelihood that the resulting low-frequency array 48 will be characterized by initial non-zero values, followed by strings of zeros interspersed with occasional non-zero values (i.e., by values occurring predominantly above the diagonal 49 in FIG. 2b). This observation holds true for generic video data and forms the basis of the entropy coding mechanism used in most video compression systems today (e.g., H.26x and MPEG-x), as well as in many compression schemes used on other types of data.

It is common to think of such zigzag forward scanned coefficient data as a succession of (run, level, sign, last) quadruples where the run-part corresponds to the number of zeros before a non-zero value, the level-part corresponds to the magnitude of the non-zero value, the sign-part is a binary indicator of the sign of the non-zero value, and the last-part is a binary value that indicates whether the current (run, level, sign) triplet is the last one in the block.

FIG. 2e shows a quadruplet sequence of entropy coding symbols 50 that describes the low-frequency block 44 and the low-frequency array 48. The sixteen original transform coefficients are now efficiently represented by just four entropy coding symbols 50, which are the output of the quantization stage 32 and which become the input to the entropy coding stage 34.

Summarizing, FIGS. 2a-e depict what occurs in the quantization stage 32, from inputting raw blocks 42 of transform coefficients to outputting entropy coding symbols 50.

In the entropy coding stage 34 of a video encoder 12 these entropy coding symbols 50 are converted into the data bit stream 22 using variable length coding (VLC). For the sake of example we continue with the H.264 video compression standard, and particularly with the variant of the generic (run, level, sign, last) scheme it uses for 4×4 blocks.

For H.264 the data bit stream 22 will have VLC encoded values corresponding to:
  a syntax element "coeff_token";
  the values of all non-zero quantization levels;
  a syntax element "total_zeros"; and
  syntax elements "run_before."

The syntax element "coeff_token" describes the number of non-zero coefficients in the 4×4 block (e.g., in the example in FIGS. 2a-e the quantity of non-zero coefficients is 4). The non-zero quantization level values along with the signs are presented in the data bit stream 22 in reverse order, with the last non-zero level indicated first and the first non-zero level indicated in the end (e.g., 1, 2, 3, and −7 in our example). The syntax element "total_zeros" describes the total number of zeros before the last non-zero level (e.g., 5 in our example). And the syntax elements "run_before" indicate the length of zero-runs before each non-zero level value. Just like the quantization levels, these are indicated in the reverse order with the zero-run before the last non-zero level indicated first followed by the zero-run before the second-last non-zero level and so on (e.g., 3, 2, 0 for our example; 3 for the run between the values 2 and 1, 2 for the run between values 3 and 2, and 0 for the run between values −7 and 3).

As mentioned above, in H.264 the data at the 4×4 block level is characterized by a large number of zeros occasionally interspersed with non-zero values. Furthermore, because of the low-frequency characteristic associated with typical video data, most of these non-zero values will occur at early positions in the zigzag forward scan order. Thus, the "total_zeros" syntax element, which counts the total number of zeros before the last non-zero level, is likely to take smaller values than larger values. Using the principles of Huffman coding, this bias in favor of smaller values as opposed to larger values, is exploited by assigning smaller sized codewords to smaller values and large-size codewords to larger values. FIG. 3 shows one such Huffman table for the syntax element "total_zeros" used in the H.264 standard.

Returning briefly again to FIG. 1, from the perspective of the video decoder 14, variable length decoding (VLD) is used to convert the data bit stream 22 back into (run, level, sign, last) quadruplets, which are then further converted to the linear zigzag scanned values, which are then converted to the two-dimensional blocks, and which are then de-quantized.

In summary, while different compression standards use different variants of this scheme to efficiently represent the sequence of quantized levels as bits, the above discussion covers the core principles.

Unfortunately, the data characteristics discussed above only hold true when the block-motion model offers a good description of the underlying video process, resulting in a residue with small energy and a low-frequency characteristic. This is what leads to non-zero coefficient levels occurring early on in the zigzag scan, and then being followed by zeros. However, there are many occasions where a natural video phenomenon will contain motion that is far more complex than can be captured by the block-motion model. For instance, common scene motions such as rotation and zoom are not described well by the block-motion model and the residue resulting from the block-motion predictor for such subject matter tends to have high energy and to be associated with a high-frequency characteristic. As a result, the syntax elements for the data bit stream that are tuned for the more commonly occurring low-frequency residue case instead offer a poor description of the residue information, resulting in higher bit-rates and poor compression.

FIGS. 4a-e are also a series of depictions of a data block 40 undergoing processing by the quantization stage 32, only here the data block 40 includes high-frequency data (i.e., values occurring predominantly below the diagonal 49 in FIG. 4b). For consistency, H.264 standard type video compression is again used in this example. FIG. 4a shows a hypothetical raw block 52 of high-frequency transform coefficients that is input to the quantization stage 32 (i.e., output from the transformation stage 30). FIG. 4b shows a high-frequency block 54 that is an intermediate result in the processing of the raw block 52 of FIG. 4a (with individual coefficients scaled down and truncated to the nearest integer). FIG. 4c illustrates application of the conventional linear zigzag forward scan order 46 to produce a one-dimensional high-frequency array 56 shown in FIG. 4d. And FIG. 4e shows a quadruplet sequence of entropy coding symbols 58 that describes the high-frequency block 54 and the high-frequency array 56.

For H.264 type compression the data bit stream 22 produced by the entropy coding stage 34 here will provide VLC encoded values wherein "coeff_token" is 4, the non-zero quantization level values along with the signs are –2, 3, 1, and 1 (since they appear in reverse order to that in the high-frequency array 56), the "total_zeros" value is 11, and the "run_before" values are 0, 0, and 0.

A key point to appreciate here is that the "total_zeros" value is markedly different for low-frequency versus high-frequency data (5 for the case in FIGS. 2a-e versus 11 for the case here in FIGS. 4a-e), and when VLC coding is performed on these based on the Huffman table of FIG. 3 the low-frequency "total_zeros" value produces a 5-bit codeword whereas the high-frequency "total_zeros" value produces an 8-bit codeword (i.e., the latter has 60% more bits than the former).

Generalizing now beyond H.264 and video to compression of all types of bandwidth limited data, when high-frequency data is encountered it is less efficiently handled and represented than low-frequency data. Among those few skilled in the art who have appreciated this previously, this has generally been reconciled as being too inconsequential to merit remedial efforts or as requiring such efforts that would be too burdensome to result in a net improvement. However, as discussed extensively below, it has been the present inventors' observation that such inefficiency is frequently consequential and it has been their labor to devise an elegant remedy for that.

DISCLOSURE OF INVENTION

Accordingly, it is an object of the present invention to provide a system for more efficient compression of bandwidth-limited digital data.

Briefly, one preferred embodiment of the present invention is a method for compressing digital data. A portion of the digital data is represented predictively and transformationally as a block of transform coefficients. Then the block is selectively quantized into a set of encoding symbols based on an indication whether the transform coefficients represent the portion as having a particular characteristic. And then the set of encoding symbols is encoded into a data bit stream.

An advantage of the present invention is that it permits more efficient compression of digital data, permitting the digital data to be represented more compactly as well as often permitting either or both of compression and decompression operations to be performed faster and with less processing resources.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended tables and figures of drawings in which:

FIGS. 2a-e are a series of depictions of a data block undergoing processing by the quantization stage of FIG. 1.

FIGS. 4a-e are also a series of depictions of a data block undergoing processing by the quantization stage, only here the data block includes high-frequency data.

FIGS. 5a-c are a series of depictions of a data block, specifically that of the raw block of FIG. 4a and the high-frequency block of FIG. 5b, now undergoing alternate quantization processing (e.g., by the quantization stage of FIG. 1 with minor changes in accord with the inventive compression system).

In the various figures of the drawings, like references are used to denote like or similar elements or steps.

BEST MODE FOR CARRYING OUT THE INVENTION

Figure 1:
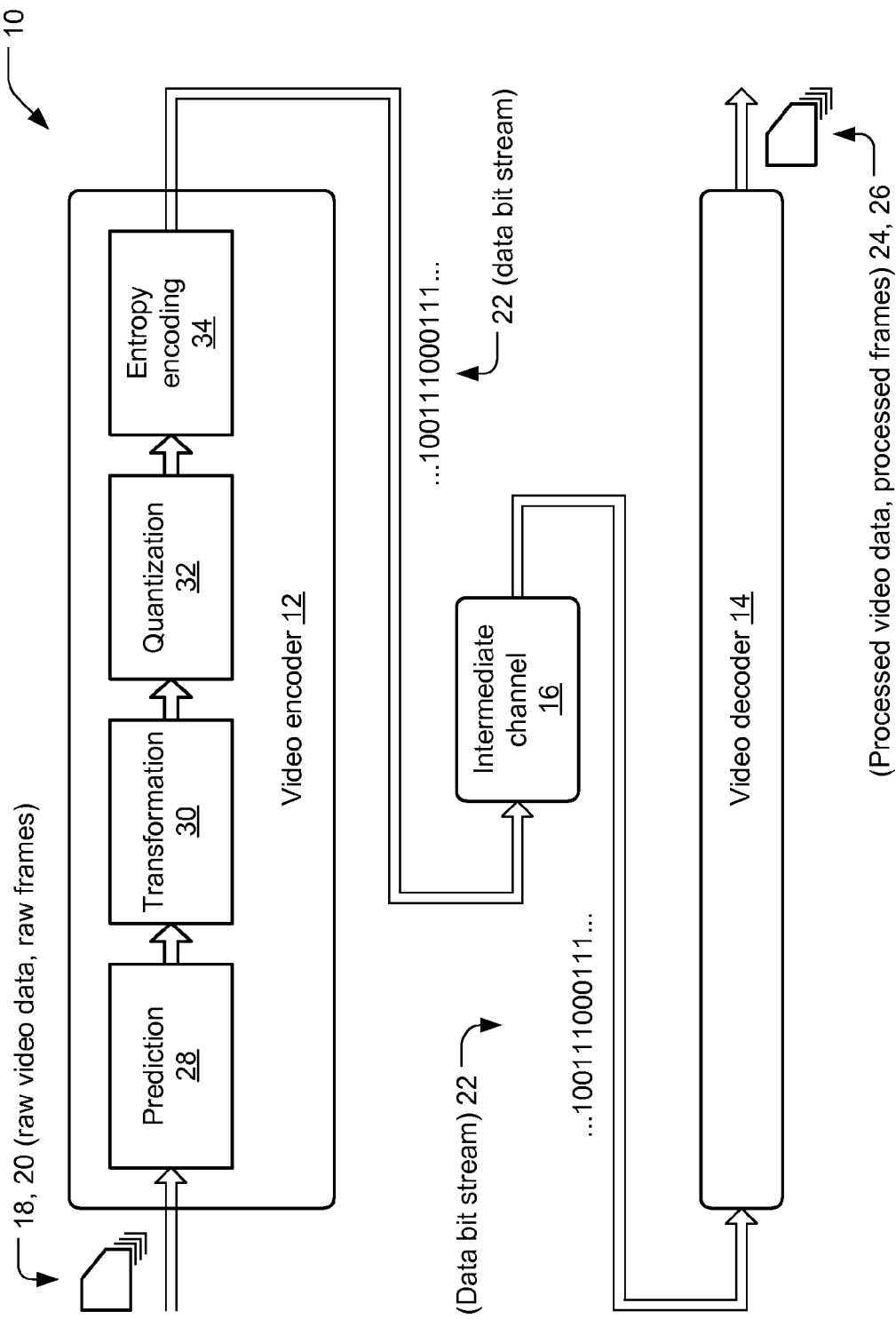
FIG. 1 (background art) is a block diagram showing the major elements of a typical end-to-end video system.

A preferred embodiment of the present invention is apparatus and method for efficient compression of digital data. As illustrated in the various drawings herein, and particularly in the views of FIG. 5 and FIG. 8, preferred embodiments of the invention are depicted by the general reference characters 100 and 200.

In the context of H.264 video compression the present inventors have observed that poor compression efficiency results for high frequency residue information because the Huffman tables for syntax elements, such as "total_zeros," are tuned for video content where these syntax elements take smaller values. As described above, in the Background Art section, these syntax elements tend to take larger values in the high frequency case, hence requiring more bits to represent them and resulting in poor compression.

Briefly, the present inventors have devised a way to counter this by adding flexibility to the interpretation of the syntax elements "total_zeros" and "run_before." Specifically, the inventors propose adding flexibility so that these syntax elements (or corresponding elements in other compression techniques) can be handled conventionally for low-frequency data, and so that they can alternately be represented with counts of zeros done backwards from the last coefficient for high-frequency data.

FIGS. 5a-c are a series of depictions of a data block 40, specifically that of the raw block 52 of FIG. 4a and the high-frequency block 54 of FIG. 5b, now undergoing alternate quantization processing (e.g., by the quantization stage 32 of FIG. 1 with minor changes in accord with the inventive compression system 100). FIG. 5a illustrates application of a novel linear zigzag reverse scan order 102 to produce a one-dimensional high-frequency array 104 shown in FIG. 5b. FIG. 5c shows a quadruplet sequence of entropy coding symbols 106 that describes the high-frequency block 54 and the high-frequency array 104. Furthermore, an optional mode flag 108 indicating that the linear zigzag reverse scan order 102 was used can be provided.

If the alternate quantization used here next uses the same technique that the quantization stage 32 of FIG. 1 uses for H.264 data, the syntax element "coeff_token" is 4; the values of all non-zero quantization levels including sign information are 1, 1, 3, and −2; the syntax element "total_zeros" is 1; and the syntax elements "run_before" are 0, 0, and 0. And if essentially the same (conventional) entropy coding stage 34 as in FIG. 1 is employed, the VLC encoded value for "total_zeros" here is a 3-bit codeword.

Thus, where using the conventional approach for the very same high-frequency block 54 and high-frequency array 56 produced a "total_zeros" of 11 (see e.g., FIG. 4e), which was VLC encoded into an 8-bit codeword, the inventive compression system 100 produces a "total_zeros" of 1 that can be VLC encoded into only a 3-bit codeword. We thus get bit-rate savings worth 5 bits.

In general, depending upon the data at hand (whether it is high-frequency or low-frequency), an encoding stage in accord with the inventive compression system 100 can switch between the forward counting mode (i.e., employing the conventional linear zigzag forward scan order 46) and the backward counting mode (i.e., employing the novel zigzag linear reverse scan order 102) for enhanced compression performance across a greater range of data. Notably, both counting modes require the same computational effort for quantization and for the major part of entropy encoding.

From the decoder standpoint, which of the two modes of quantization and encoding was used can be indicated by the binary valued "counting mode" mode flag 108 which indicates whether forwards or backwards counting was done. Of course, the addition of an extra mode flag itself constitutes an overhead, but it has been the inventors' observation that the inventive compression system 100 still often provides a net benefit.

In theory, the mode flag 108 is optional, although it is expected by the inventors that few embodiments of the invention will not include it in at least some form. For example, using the novel zigzag linear reverse scan order 102 with no indication of this usage in an otherwise conventional compression process is one way to encrypt the digital data in the resulting data bit stream. Alternately, for some types of digital data the zigzag linear reverse scan order 102 might inherently be more efficient and its use by an encoder thus assumed by a decoder for data of the type.

Figure 6:
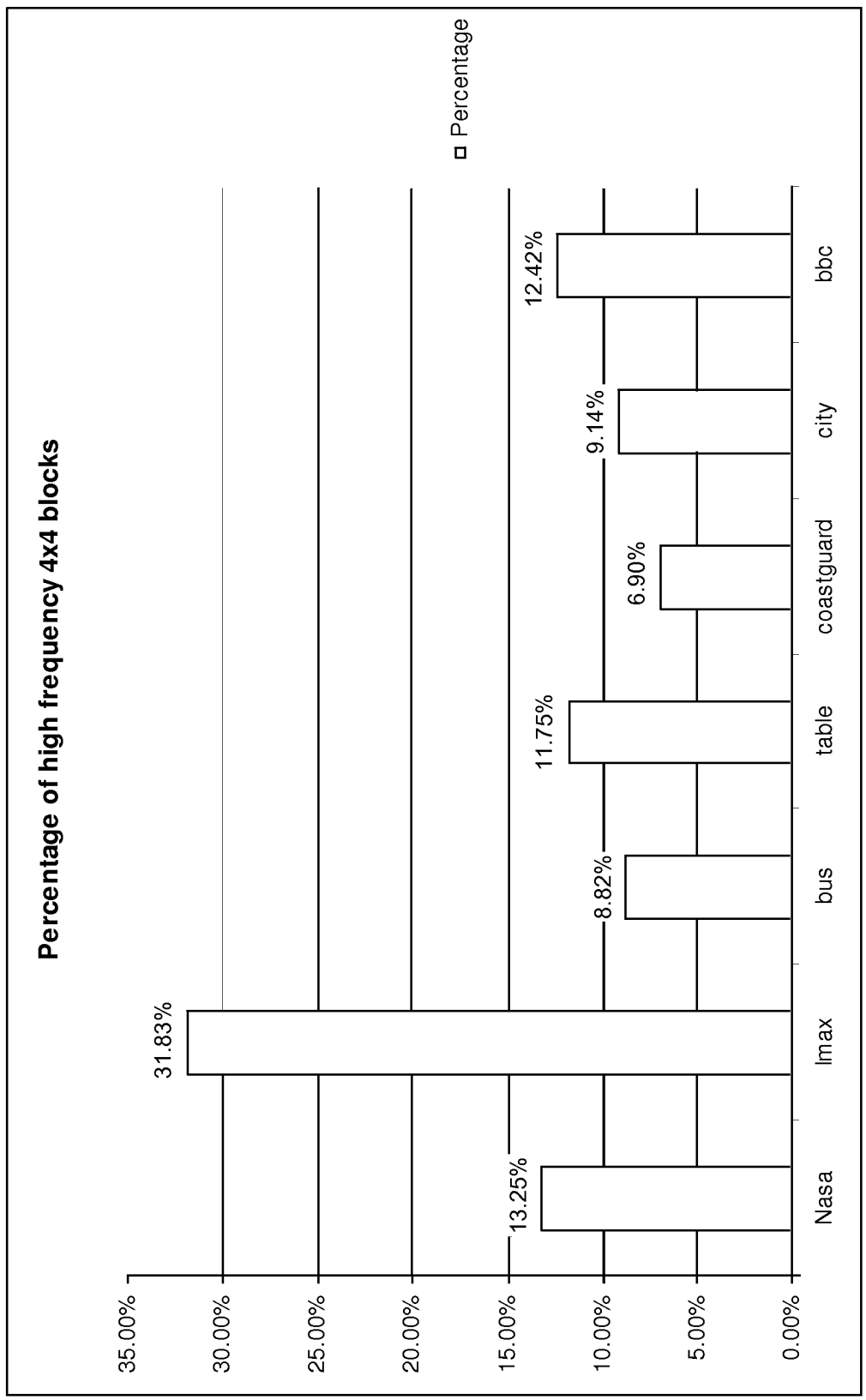
FIG. 6 is a graph presenting statistical analysis of the amount of high-frequency data blocks in typical video data being compressed into H.264 bit streams.

Digressing slightly, before considering the burden of adding the mode flag 108, it can be helpful to appreciate the amount of high-frequency data that is actually present in typically video data. FIG. 6 is a graph presenting statistical analysis of the amount of high-frequency data blocks in typical video data being compressed into H.264 bit streams. The bar labeled "Nasa" represents video of a rocket launch; the bar labeled "Imax" represents a movie trailer with zoom of a moon walk; the bar labeled "Bus" represents a video of a city bus traveling across frame down a street; the bar labeled "Table" represents a video of a ping pong game; the bar labeled "Coastguard" represents a video of a vessel traveling across frame in a nautical setting; the bar labeled "City" represents an aerial looking-downward video of major cityscape; and the bar labeled "BBC" represents a captured video sequence of typical British television programming. As would be expected for "movie trailer footage" with lots of quick action, rapid scene changes, and zoom-in and zoom-out special effects, the "Imax" sequence has a lot of high-frequency content. Perhaps surprising to some, however, is the quantity of high-frequency content even in the other scenes. These are of traditional block-motion video subject matter, and the values in FIG. 6 tend to undercut the traditional argument that most such subject matter has only inconsequential high-frequency content.

In summary, even for H.264 video compression with its sophisticated motion modeling, there is a significant percentage of data that is associated with high-frequency characteristics. The present inventive compression system 100 is directly applicable to such data. Similarly, even greater applicability and benefit can be expected for previous generation video compression standards such as MPEG-2 and MPEG-4, with their relatively simple motion modeling.

With its implications about the potential realizable benefits, FIG. 6 now permits a reasoned analysis of how much overhead the addition of the extra mode flag 108 might entail. In FIG. 5c the mode flag 108 is depicted as being present with the entropy coding symbols 106, implying that it is provided with each set of entropy coding symbols 106 for each data block 40. This can be the case, but in most embodiments of the inventive compression system 100 that will desirably so. It is the present inventors' position (a) that this extra syntax information for this can be amortized over larger block sizes and (b) that it can be encoded in a more efficient fashion.

With respect to (a), such the mode flag 108 can be indicated at a coarser level than at a 4×4 block. For instance, a natural granularity at which the mode flag 108 can be indicated is at the granularity of the motion block, the frame (or still image), a sub-sequence of video frames, or even some other unit basis entirely (e.g., a one second block of audio data). If a video motion block size of 16×16 is chosen, for example, the mode flag 108 then can be indicated at a 16×16 block level and the same mode would be used for all sixteen 4×4 blocks inside the 16×16 block, thus amortizing the extra syntax information.

Figures 3, 7, 9A, 9B:
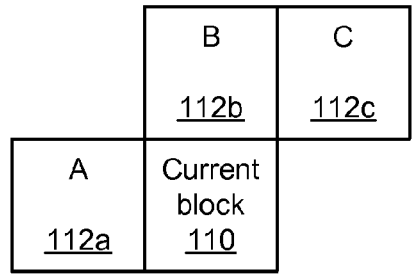
FIG. 3 shows a Huffman table for the syntax element "total_zeros" used in the H.264 standard, as might be applied to the data represented in FIGS. 2a-e.
FIG. 7 is a block diagram depicting an example in which a current block has three causal spatial neighbors that are used for spatio-temporal correlations to amortize the overhead of an extra mode flag used by some embodiments of the present invention.
FIGS. 9a-b depict data blocks having other characteristics in the digital data than high or low frequency that may be employed by alternate embodiments of the present invention.

With respect to (b), additional savings on the average bit-rate incurred by the mode flag 108 can be obtained by using context-based methods for predicting the likely value for the mode flag. Since typical video data exhibits high spatio-temporal correlations, the context information can be derived from values for the mode flag 108 of the spatial or temporal neighbors of the block in question. FIG. 7 is a block diagram depicting an example in which a current block 110 has three causal spatial neighbors (ABC) (neighbor blocks 112a-c) that are used for this. Such context-based prediction would be especially beneficial when fractional bit-rate methods such as arithmetic coding are used for entropy coding (e.g., as is the case for the context-based adaptive binary arithmetic coding (CABAC) mode in H.264 video compression standard).

Figure 8:
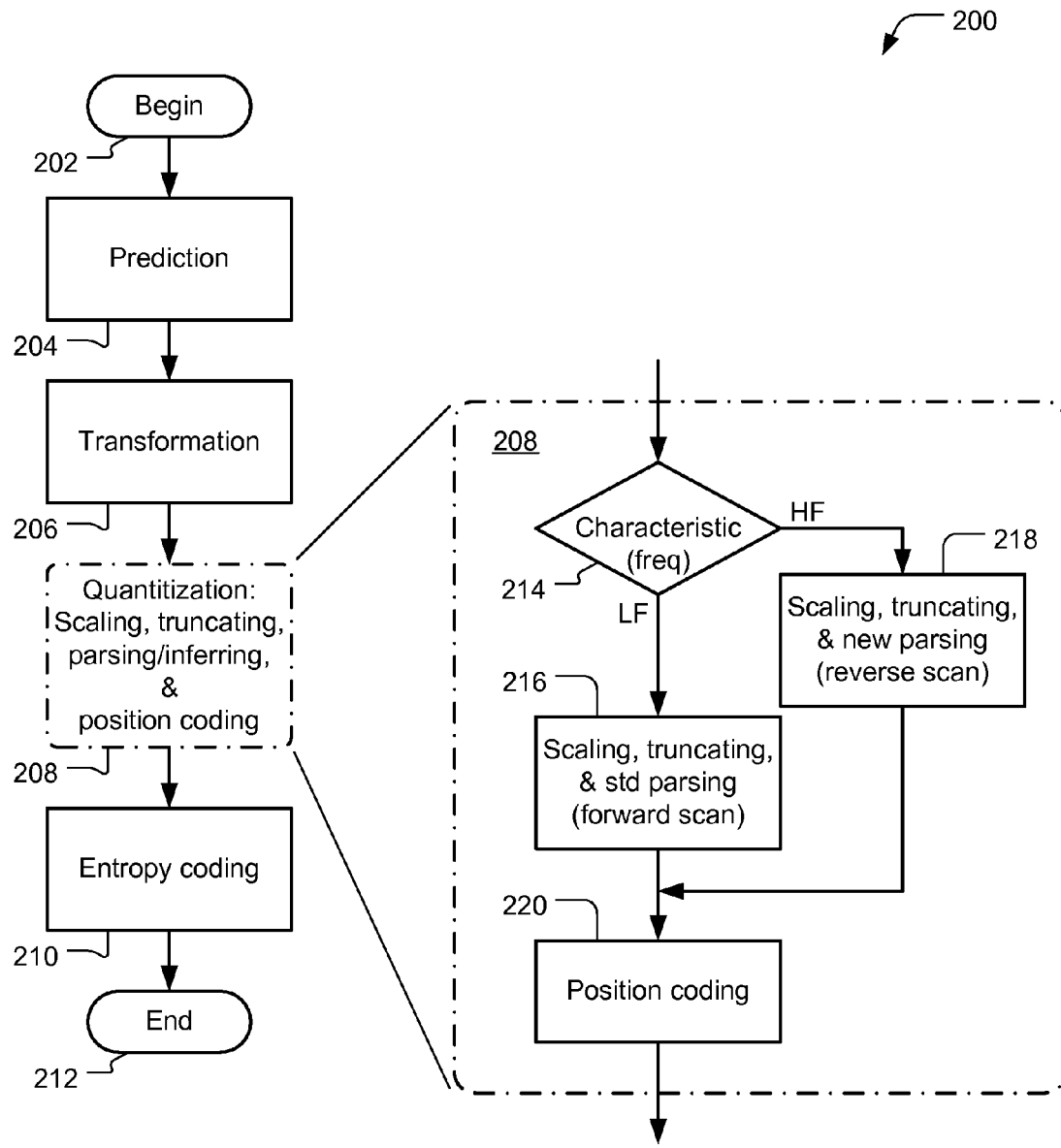
FIG. 8 is a flowchart depicting a digital data compression process that may be used by the compression system of the present invention.

FIG. 8 is a flowchart depicting a digital data compression process 200 that may be used by the compression system 100. The compression process 200 begins in a step 202, where any set-up can optionally be performed. In a step 204 prediction is then performed. This can be entirely conventional, in the manner that the prediction stage 28 performs its task. Next, in a step 206, transformation is performed. This can also be entirely conventional, in the manner the transformation stage 30 performs its task. The digital data compression process 200 departs from convention and from prior art approaches in the following step, a step 208 that is discussed in more detail, below. Next, in a step 210, entropy encoding is performed. This can also be entirely conventional, in the manner the traditional entropy coding stage 34 performs its task. In most variations of the compression process 200 (and in most embodiments of the compression system 100), however, this will be modified to at least handle the mode flag 108 (this step is also discussed in more detail, below). And in a step 212 the compression process 200 finishes, here performing any optional wrap-up.

In FIG. 8 step 208 is shown having two major internal operations and also in expanded form. Conceptually, the quantization in step 208 includes parsing (or inferring information about) the contents of the data block 40 and then creating the entropy coding symbols 106 based on that. This point is emphasized in the expanded depiction of step 208. Here it can be seen that step 208 can include a step 214 where a determination (an analysis based on a characteristic of the digital data) is made which type of parsing to apply. Based on this determination, either a step 216 for the conventional zigzag linear forward scan order 46 or a step 218 for the novel zigzag linear reverse scan order 102 is then performed. And following this, in a step 220, position coding is performed to create the entropy coding symbols 106 (and typically to add the optional mode flag 108 to signal to a decoder which parsing approach was employed in encoding).

Some particular variations of the compression process 200 from how it is represented in FIG. 8 merit noting. The step 220 is depicted as being the same regardless of whether it flows step 216 or step 218. While there will, of course, be some minor difference here if the optional mode flag 108 is employed, entirely different algorithms for position coding can also be used. Using the same position coding algorithm works well in the examples used herein, which are based on video data and the standardized forms of compression applied to it, but this should not be taken as implying a limitation or even desirability. For instance, the present invention can also be applied to audio type data, which often has multiple channels for stereo or other sophisticated effects. Using different position coding algorithms may be more efficient here, possibly by applying different ones chosen to take advantage of inherent relationship between the channels to achieve more efficient compression of the audio data.

Similarly, when the optional mode flag 108 is employed, step 210 will typically have minor differences over what would have previously been done conventionally. Additionally, however, here as well there is no particular reason that step 210 (VLC entropy encoding) has to be performed the same for the output from step 216 as for the output from step 218.

In summary, providing "counting mode flexibility" and using a mode flag 108 to indicate the particular mode used enables an efficient representation of low frequency as well as high-frequency data, as opposed to only the low-frequency data that is the target of the present-day video compression standards. Furthermore, as noted herein repeatedly and now for the last time, video data is merely one type of data that is suitable for application of the inventive compression system 100. For example, without limitation, it is relatively easy to appreciate that suitable embodiments of the inventive compression system 100 can be beneficially applied to still image and audio data. Conceptually, images can be thought of as similar to the individual frames of raw video data in the examples presented above, and compressing audio data today (e.g., MP3) especially uses most of the same principles and techniques as compressed video.

Finally, it should be noted that we have used examples based on low-frequency and high-frequency digital data, since these should readily be ones readily appreciated by skilled practitioners in this art. The spirit of the present invention, however, has broader applicability than merely to above the diagonal 49 low-frequency data (e.g., FIG. 2b) versus below the diagonal 49 high-frequency data (e.g., FIG. 4b).

From FIG. 2b and FIG. 4b it can be appreciated that frequency is a data characteristic that the present invention can employ. And from the two data blocks 40 in FIGS. 9a-b it can be further appreciated that there are other characteristics of the digital data that may be employed by embodiments of the present invention. FIG. 9a shows a low-frequency block 114 that will nonetheless be inefficiently compressed if frequency is the criteria used in step 214, and FIG. 9b shows a high-frequency block 116 that will also be inefficiently compressed if frequency is the criteria used in step 214. Accordingly, while frequency is expected to be the analysis characteristic most employed by embodiments of this invention other analysis characteristics may additionally or alternately also be used in other embodiments.

While various embodiments have been described above, it should be understood that they have been presented by way of example only, and that the breadth and scope of the invention should not be limited by any of the above described exemplary embodiments, but should instead be defined only in accordance with the following claims and their equivalents.

What is claimed is:

1. A method of processing data, said method comprising:
accessing first data comprising a block of transform coefficients; and
quantizing said first data to generate a set of encoding symbols, wherein said quantizing further comprises:
analyzing said first data to determine whether said first data is associated with a first frequency;
if said first data is associated with said first frequency, parsing said first data using a first operation, wherein said first operation is associated with a first type of scan; and
if said first data is not associated with said first frequency, parsing said first data using a second operation, wherein said second operation is associated with a second type of scan.

2. The method of claim 1, wherein said first frequency is a high frequency.

3. The method of claim 1 further comprising:
encoding said set of encoding symbols into a data stream.

4. The method of claim 3, wherein said encoding further comprises encoding said set of encoding symbols with a flag, wherein said flag is associated with an operation used for said quantizing, and wherein said operation is selected from a group consisting of said first operation and said second operation.

5. The method of claim 1, wherein said first operation includes a reverse zigzag scan.

6. The method of claim 1, wherein said second operation includes a forward zigzag scan.

7. The method of claim 1 further comprising:
transforming said first data into a frequency domain to generate said block of transform coefficients.

8. The method of claim 1 further comprising:
performing prediction on said first data, wherein said performing prediction further comprises:
determining a change in location associated with said first data with respect to said second data; and
determining a change in content associated with said first data with respect to said second data.

9. The method of claim 1, wherein said quantizing further comprises performing an operation selected from a group consisting of scaling down said set of transform coefficients and truncating said set of transform coefficients.

10. The method of claim 1, wherein said determining further comprises analyzing a relationship between a number of zero coefficients of said set of transform coefficients and a number of non-zero coefficients of said set of transform coefficients.

11. The method of claim 1, wherein said set of transform coefficients comprises an ordering of zero coefficients and non-zero coefficients, and wherein said determining further comprises analyzing a relative positioning, in said ordering, of said zero coefficients with respect to said non-zero coefficients.

12. A system comprising:
a first component operable to access first data comprising a block of transform coefficients; and
a second component operable to quantize said first data and further to generate a set of encoding symbols based on quantization of said first data, wherein said second component is further operable to:
analyze said first data to determine whether said first data is associated with a first frequency;
if said first data is associated with said first frequency, parse said first data using a first operation, wherein said second operation is associated with a second type of scan; and
if said first data is not associated with said first frequency, parse said first data using a second operation, wherein said first operation is associated with a first type of scan.

13. The system of claim 12, wherein said first frequency is a high frequency.

14. The system of claim 12 further comprising:
a second component operable to encode said set of encoding symbols into a data stream.

15. The system of claim 14, wherein said second component is further operable to encode said set of encoding symbols with a flag, wherein said flag is associated with an operation used for said quantizing, and wherein said operation is selected from a group consisting of said first operation and said second operation.

16. The system of claim 12, wherein said first operation includes a reverse zigzag scan.

17. The system of claim 12, wherein said second operation includes a forward zigzag scan.

18. The system of claim 12 further comprising:
a third component operable to transform said first data into a frequency domain and further operable to generate said block of transform coefficients based on transformation of said first data.

19. The system of claim 12 further comprising:
A fourth component operable to perform prediction on said first data, wherein said fourth component is further operable to:
determine a change in location associated with said first data with respect to said second data; and
determine a change in content associated with said first data with respect to said second data.

20. The system of claim 12, wherein said first component is further operable to perform an operation selected from a group consisting of scaling down said set of transform coefficients and truncating said set of transform coefficients.

21. The system of claim 12, wherein said first component is further operable to determine whether said first data is associated with said first frequency by analyzing a relationship between a number of zero coefficients of said set of transform coefficients and a number of non-zero coefficients of said set of transform coefficients.

22. The system of claim 12, wherein said set of transform coefficients comprises an ordering of zero coefficients and non-zero coefficients, and wherein said first component is further operable to determine whether said first data is associated with said first frequency by analyzing a relative position, in said ordering, of said zero coefficients with respect to said non-zero coefficients.

23. A system comprising:
means for accessing first data comprising a block of transform coefficients; and
means for quantizing said first data to generate a set of encoding symbols, wherein said means for quantizing further comprises:
means for analyzing said first data to determine whether said first data is associated with a first frequency;
means for parsing, if said first data is associated with said first frequency, said first data using a first operation; and
means for parsing, if said first data is associated with said first frequency, said first data using a second operation.

24. The system of claim 23, wherein said first frequency is a high frequency.

25. The system of claim 23 further comprising:
means for encoding said set of encoding symbols into a data stream.

26. The system of claim 25, wherein said means for encoding further comprises means for encoding said set of encoding symbols with a flag, wherein said flag is associated with an operation used for said quantizing, and wherein said operation is selected from a group consisting of said first operation and said second operation.

27. The system of claim 23, wherein said first operation includes a reverse zigzag scan.

28. The system of claim 23, wherein said second operation includes a forward zigzag scan.

29. The system of claim 23 further comprising:
means for transforming said first data into a frequency domain to generate said block of transform coefficients.

30. The system of claim 23 further comprising:
means for performing prediction on said first data, wherein said means for performing prediction further comprises:
means for determining a change in location associated with said first data with respect to said second data; and
means for determining a change in content associated with said first data with respect to said second data.

31. The system of claim 23, wherein said means for quantizing further comprises means for performing an operation selected from a group consisting of scaling down said set of transform coefficients and truncating said set of transform coefficients.

32. The system of claim 23, wherein said means for determining further comprises means for analyzing a relationship between a number of zero coefficients of said set of transform coefficients and a number of non-zero coefficients of said set of transform coefficients.

33. The system of claim 23, wherein said set of transform coefficients comprises an ordering of zero coefficients and non-zero coefficients, and wherein said means for determining further comprises means for analyzing a relative positioning, in said ordering, of said zero coefficients with respect to said non-zero coefficients.

* * * * *